June 5, 1962 K. RITTER 3,037,572
VEHICLES, SUCH AS TRACTORS AND THE LIKE
Filed Feb. 5, 1959 4 Sheets-Sheet 4

INVENTOR
Kaspar Ritter
BY
Michael S Striker
ATTORNEY

United States Patent Office 3,037,572
Patented June 5, 1962

3,037,572
VEHICLES, SUCH AS TRACTORS AND THE LIKE
Kaspar Ritter, Kirchheim (Teck), Wurttemberg, Germany, assignor to Firma Allgaier-Werke G.m.b.H., Uhingen, Wurttemberg, Germany
Filed Feb. 5, 1959, Ser. No. 791,373
4 Claims. (Cl. 180—54)

The present invention relates to vehicles such as tractors adapted to be used for agricultural purposes.

One of the objects of the present invention is to provide a vehicle of the above type which is of an extremely compact and light-weight construction and which at the same time is capable of having all types of accessories connected therewith to be operated thereby and to be located in positions where they may be easily observed by the operator.

Another object of the present invention is to provide a vehicle of the above type which is capable of being driven either forwardly or rearwardly through a speed range from an extremely slow to a very high speed with a stepless variation in the speed.

A further object of the present invention is to provide a vehicle of the above type with an extremely simple driving engine which operates very reliably and which requires a minimum amount of maintenance.

Another object of the present invention is to provide a vehicle of the above type with a plurality of power-takeoff shafts each of which may be optionally driven either according to the speed of the engine of the vehicle or according to the speed of movement of the vehicle, and some of which may be driven simultaneously according to these speeds.

The objects of the present invention also include the provision of a vehicle of the above type which is capable of driving accessories located either forwardly of the vehicle, intermediate of the vehicle between the front and rear axles thereof, or at the rear of the vehicle.

It is also an object of the present invention to provide an arrangement of the parts of the vehicle which is capable of accommodating the fuel tank and storage battery of the vehicle in a particularly favorable manner.

With the above objects in view the present invention includes in a vehicle such as a tractor or the like a rear housing and an elongated tubular front housing fixed to and extending forwardly from the rear housing, the front and rear housings cooperating together to form a longitudinal central frame for the vehicle. A front wheel means is operatively connected with the front housing adjacent the front end thereof and a rear wheel means is operatively connected with the rear housing adjacent the rear end thereof. The rear housing houses at least part of an engine of the vehicle and a transmission which is operatively connected with the engine and with the rear wheel means for driving the latter. A plurality of power-takeoff shafts extend from different portions of the front and rear housing means, and a means is provided for driving these power-takeoff shafts optionally either from the engine or from the transmission so that the power-takeoff shafts may be driven either according to the speed of the engine or according to the speed of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
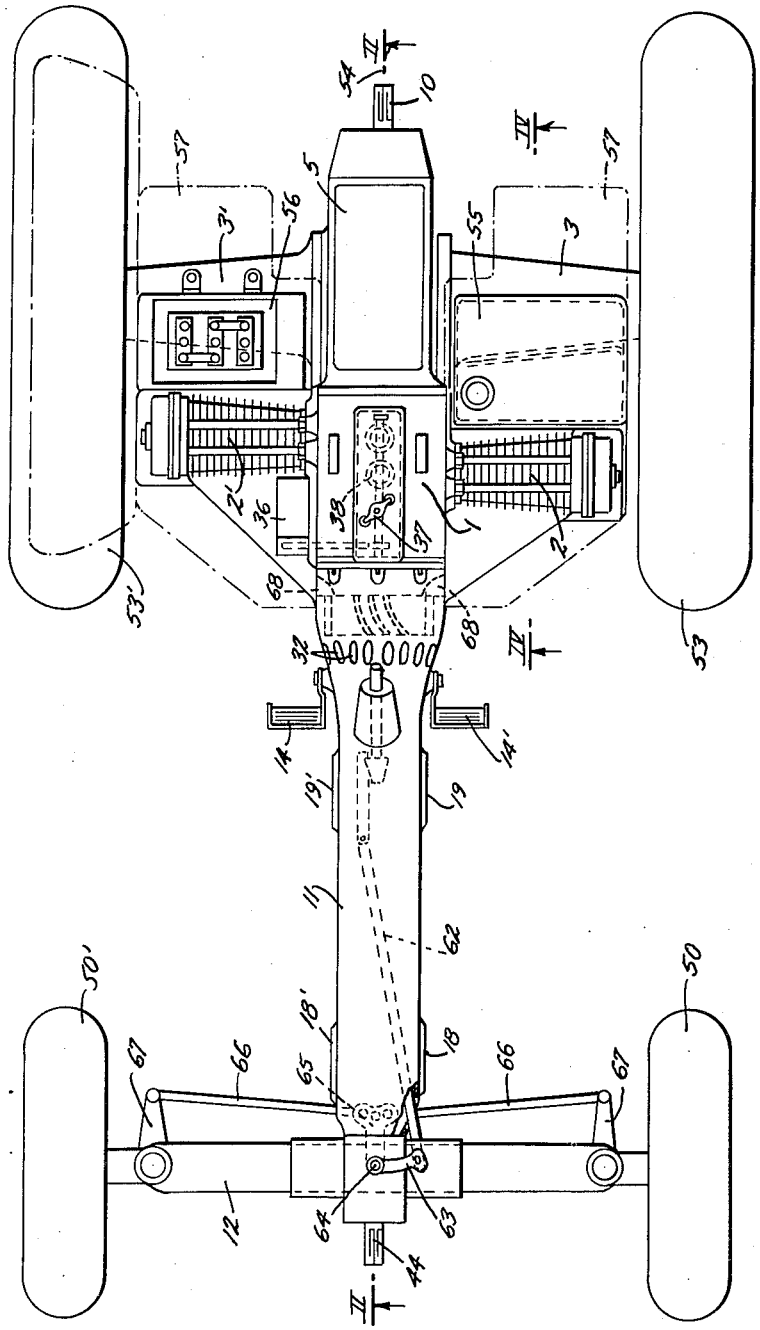
FIG. 1 is a top plan view of a vehicle constructed according to the present invention, the components which are located above the longitudinal central frame of the vehicle being omitted, and the floor of the vehicle being indicated only in dot-dash lines.
Figure 2:
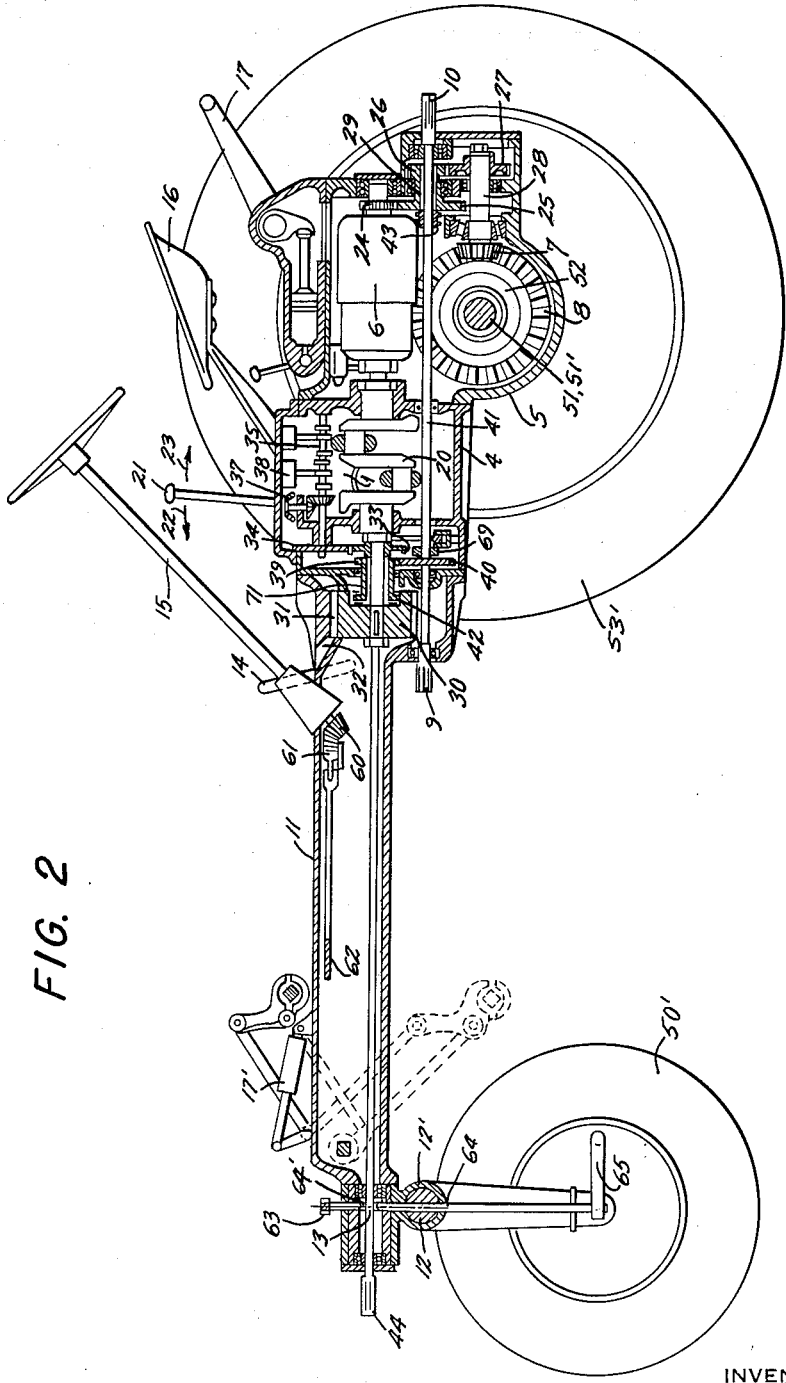
FIG. 2 is a longitudinal sectional elevation of view taken along the line II—II of FIG. 1 in the direction of the arrows, FIG. 2 showing in addition to the structure which is shown in FIG. 1 such elements as the steering wheel and steering column, the seat, the speed control lever, and lifting devices, all of which are omitted from FIG. 1 for the sake of clarity.

Referring now to FIGS. 1 and 2, the tractor of the present invention includes a rear housing means which is made up of the housing 5 which accommodates the transmission of the vehicle and the housing 4 connected to the front end of the housing 5 and forming the crank case of the engine of the vehicle. An elongated tubular front housing means 11 is connected to and extends forwardly from the rear housing means 4, 5, and this elongated tubular front housing means 11 extends all the way up to the front end of the vehicle. As is particularly apparent from FIGS. 1 and 2 the front housing means 11 cooperates together with the rear housing means 4, 5 to form the elongated central longitudinally extending frame of the vehicle, this frame extending along the longitudinal central axis of the vehicle.

A front wheel means is operatively connected to the front housing means 11 adjacent the front end thereof, and this front wheel means includes the front axle 12 as well as the front wheels 50 and 50' operatively connected to the front axle 12.

The vehicle also includes a rear wheel means, and this rear wheel means is composed of a pair of rear axle portions 51 and 51' which are coaxial with each other and which are respectively connected with the rear wheels 53 and 53'. It will be noted that while the front axle means is simply fixed to an underside of the front housing means 11, the rear axle means extends into the interior of the housing 5 where the pair of rear axle portions 51 and 51' are operatively connected with a differential which is diagramatically indicated at 52 in FIG. 2.

The housing portion 4 of the rear housing means forms the crank case of the engine 1 of the vehicle, and this engine is of the opposed piston type and includes a pair of horizontal cylinders 2 and 2' respectively extending laterally from opposite sides of the crank case 4, as is particularly apparent from FIG. 1. The housing 5 has a pair of tubular horizontal branches 3 and 3', as is shown in FIG. 1, and these branches of the housing 5 accommodate the rear axle portions 51 and 51', respectively. It will be noted from FIG. 1 that the cylinder 2 is located forwardly of the housing portion 3 by a distance greater than the distance between the cylinder 2' and the housing portion 3'.

The rear housing portion 5 accommodates in its interior a transmission for the rear wheel means, and this transmission includes a hydrostatic torque converter 6 which may have the construction shown in U.S. Patent 2,687,-049 and which through a suitable gear transmission drives a bevel gear 7 which is in mesh with another bevel gear 8 which surrounds the differential 52 and which is operatively connected therewith for transmitting a drive therethrough to the rear wheels.

The vehicle of the invention includes a plurality of power-takeoff shafts, and a pair of these power-takeoff shafts have free outer ends 9 and 10 shown in FIG. 2 extending forwardly and rearwardly of the rear housing means 4, 5, respectively, to provide power-takeoff connections.

A pair of pedals 14 and 14' for controlling the operation of the vehicle are carried by the front housing means 11 adjacent the rear end thereof, and the steering column 15 is operatively connected with the front wheels 50 and 50' through a mechanism turnable about the axis 13, which is normal to the longitudinal axis, for steering the vehicle. Thus, as is diagrammatically shown in FIGS. 1 and 2, the bottom end of the steering column is fixed with a bevel gear 60 which meshes with a rack 61 which is guided for horizontal movement in a direction parallel to the longitudinal axis of the vehicle, and the front end of the rack 61 is pivotly connected with an elongated link 62 which extends freely through an opening adjacent the front end of the housing 11. The link 62 is pivotly connected at its front end to a lever 63 which is fixed to a shaft 64 turnable about the vertical axis 13 and extending through suitable openings in the housing 11, the front axle 12, and the tubular portion 12' of the housing 11 which accommodates the front axle 12, shaft 64 extending to a point beneath the front axle 12, where the bottom end of the shaft 64 is fixed to a lever 65 of substantially T-shaped configuration, as is evident from FIG. 1. A pair of links 66 are pivotally connected with the member 65 in a manner shown in FIG. 1, and the outer ends of the links 66 are pivotally connected with the members 67, respectively, for turning the front wheels in a manner well known in the art so that the operator is capable of steering the vehicle.

The right pedal 14 actuates the brakes of the vehicle, in a known way, and the left pedal 14' operates a clutch which is described below.

The seat 16 for the operator of the vehicle is supported on top of the crank case 4 as is evident from FIG. 2.

A plurality of hydraulic lifting devices 17 and 17' are carried by the frame formed by the housing means 11 and 4, 5, the rear power lifting device 17 including the hydraulic structure which is diagrammatically shown at the upper right portion of FIG. 2 and being operated by a lever in a known way. The front power lifting device 17' also is hydraulic, and the hydraulic lines as well as the rest of the hydraulic structure is omitted from the drawings for the sake of clarity. This hydraulic device 17' is turnable from the lower dot-dash line position shown in FIG. 2 to the upper solid line position.

Surfaces 18, 18' and 19, 19' are located at the sides of the front housing means 11, as shown in FIG. 1, for the purpose of connecting accessories to the vehicle.

The crank shaft 20 of the engine is shown in FIG. 2. This crank shaft is turnably supported by suitable bearings carried by transverse walls of the crank case 4, as indicated in FIG. 2.

A lever 21 is accessible to the operator for controlling the forward and rearward speed of the vehicle. This lever 21 cooperates with the torque converter 6 in a known way. The lever 21 is turnable forwardly in the direction of arrow 22 from a neutral position for steplessly increasing the forward speed of the vehicle as the lever 21 is turned forwardly to a greater degree, and the lever 21 is also turnable rearwardly in the direction of arrow 23 for steplessly increasing the rearward speed of the vehicle according to the extent to which the lever 21 is turned rearwardly from its neutral position.

The right end of the crank shaft 20, as viewed in FIG. 2 is connected to the input end of the torque converter 6 and the output end of the torque converter 6 fixedly carries a gear 24 of the transmission, this gear 24 meshing with a gear 25 which is coaxially fixed with a gear 26 which in turn meshes with another gear 27, so that the transmission includes the two stages of reduction, namely gears 24, 25 and 26, 27. The gear 27 is fixed to the shaft 28 which fixedly carries the bevel gear 7 referred to above.

The pair of gears 25 and 26 are fixedly connected to each other by a hollow tubular shaft 29.

The left end of the crank shaft 20, as viewed in FIG. 2, fixedly carries a fly wheel 30 of the engine, and this fly wheel carries at its outer periphery vanes 31 which enable the fly wheel to perform the additional function of the impeller of a blower. The rear end portion of the front housing means 11 is formed with inlets 32 for air which is sucked in by this blower structure, and this air is blown outwardly to the sides of the crank case 4 through outlets 68 shown in FIG. 1, so that in this way a forced stream of air is driven axially past the air cooled cylinders 2 and 2'.

As is evident from FIG. 2, the crank shaft 20 fixedly carries a gear 33 which meshes with a gear 34 which is fixedly carried by a cam shaft 35 which is supported for rotation about its axis and which operates various devices such as the valves of the engine. The drive 33, 34 is also operatively connected with the generator 36 (FIG. 1), and the cam shaft 35 also serves to drive a governor 37 and an injection pump 38, as shown in FIG. 2.

The crank shaft 20 also carries for free rotation a gear 39 which meshes with a gear 40 for rotating the latter, and this gear 40 is freely turnable on an elongated shaft 41 the left end portion of which, as viewed in FIG. 2, forms the power-takeoff shaft 9 integral with shaft 41. A clutch member 69 which is capable of being shifted in a known way by the operator is splined to the shaft 41 so as to be axially movable therealong while being constrained to rotate therewith, and this clutch member 69 has clutch dogs which cooperate with clutch dogs on the right face of the gear 40 so that the clutch member 69 is shiftable by the operator between a position where it connects the gear 40 to the shaft 41 for rotating the latter together with the power-takeoff shaft 9, or the clutch member 69 may be moved by the operator to an inactive position where the drive from the gear 40 to the shaft 41 is disconnected.

The gear 39 is not directly connected to the shaft 20 for rotation therewith at all times. This gear 39 is fixed to the right end, as seen in FIG. 2, of an elongated tubular member 71 through which the left end portion of the crank shaft 20 passes, and the left end of this tubular member forms part of a friction clutch 42 which is actuated by the operation of the pedal 14'. Thus, the operator is capable of actuating the pedal 14' for optionally connecting the drive from the crank shaft of the engine to the gear 39 so that the power-takeoff shaft 9 is controlled by actuation of the pedal 14', assuming that the clutch member 69 is in its engaged position.

Figure 5:
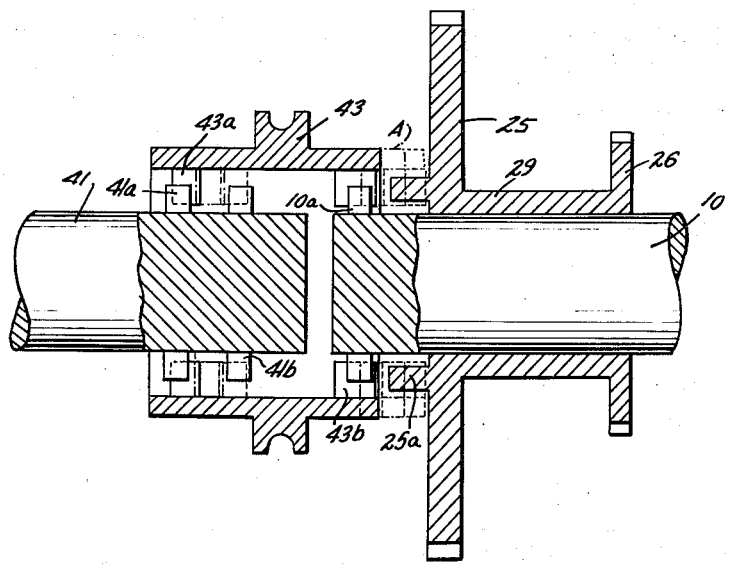
FIG. 5 is a fragmentary partly sectional elevational view on an enlarged scale showing the details of a clutch arrangement which enables power-takeoff shafts to be driven in a variety of ways.

The power-takeoff shaft 10 is coaxial with the shaft 41, and a clutch member 43 is capable of being axially shifted by the operator in a known way so as to provide the various possibilities in the drive of the power-takeoff shafts 9 and 10. As may be seen from FIG. 5, when the clutch member 43 is in the position shown in FIG. 5, this clutch member 43 has its teeth 43a and 43b engaging the teeth 41a and 10a of the shafts 41 and 10, respectively, so that the clutch member 43 cooperates with the shafts 41 and 10 for driving the latter from the shaft 41, so that at this time the power-takeoff shaft 10 is driven directly from the engine, the clutch member 69 being engaged at this time. Thus both of the power-takeoff shafts 9 and 10 are simultaneously driven at a speed which is proportional to the speed of the engine and which does not in any way depend upon the speed of movement of the vehicle. When the clutch member 43 is shifted to the right from the position shown in FIG. 5 to an intermediate position A, its teeth 43a move out of engagement with teeth 41a of the shaft 41 and its teeth 43b bridge the gap between teeth 10a of the shaft 10 and teeth 25a at the left face of the gear 25, so that at this time only the shaft 10 is driven from the gear 25, and in this way the power-takeoff shaft 10 is driven according to a speed which is proportional to the speed of movement of the vehicle. Upon further movement of the clutch member 43 to the right, teeth 43b move out of engagement with the teeth 10a of the shaft 10 and teeth 43a move into engagement with an additional set of teeth 41b of the shaft 41 so that the clutch member 43 interconnects elements 25 and 41, and simultaneously with the location of the clutch member 43 in its right end position, as viewed in FIG. 5, the clutch member 69 is moved to its disengaged position in a known way, so that at this time the drive from the transmission is transmitted to the shaft 41 so as to enable the power-takeoff shaft 9 to be driven at a speed which is proportional to the speed of movement of the vehicle. Therefore, with this arrangement it is possible to operate the shaft 9 at a speed which is proportional to the engine speed or to simultaneously operate the shafts 9 and 10 at a speed which is proportional to the engine speed. It is also possible to operate the shaft 10 at a speed proportional to the speed of movement of the vehicle, and it is furthermore possible to simultaneously operate the shafts 9 and 10 at speeds which are respectively proportional to the speed of the engine and the speed of movement of the vehicle. The operation of the shafts 9 and 10 directly from the engine enables the shafts to be set into rotation through the friction clutch 42 even when the shafts are under load.

The power-takeoff shafts 9 and 10 may be connected with any desired accessories for driving the same, and it will be noted that any accessories connected with the power takeoff shaft 9, which is directly beneath the upper portion of the housing 11 and which is located substantially midway between the front and rear axles, will be capable of being easily and comfortably observed by the operator and furthermore there is sufficient space between the front and rear axles in order to accommodate any accessories which are connected with the power-takeoff shaft 9. With the structure which is shown in FIG. 2 the power-takeoff shaft 44, which is directly connected with the crank shaft 20 can only be driven at a speed proportional to the speed of the engine in order to operate an accessory which is connected to the front of the vehicle.

Figure 3:
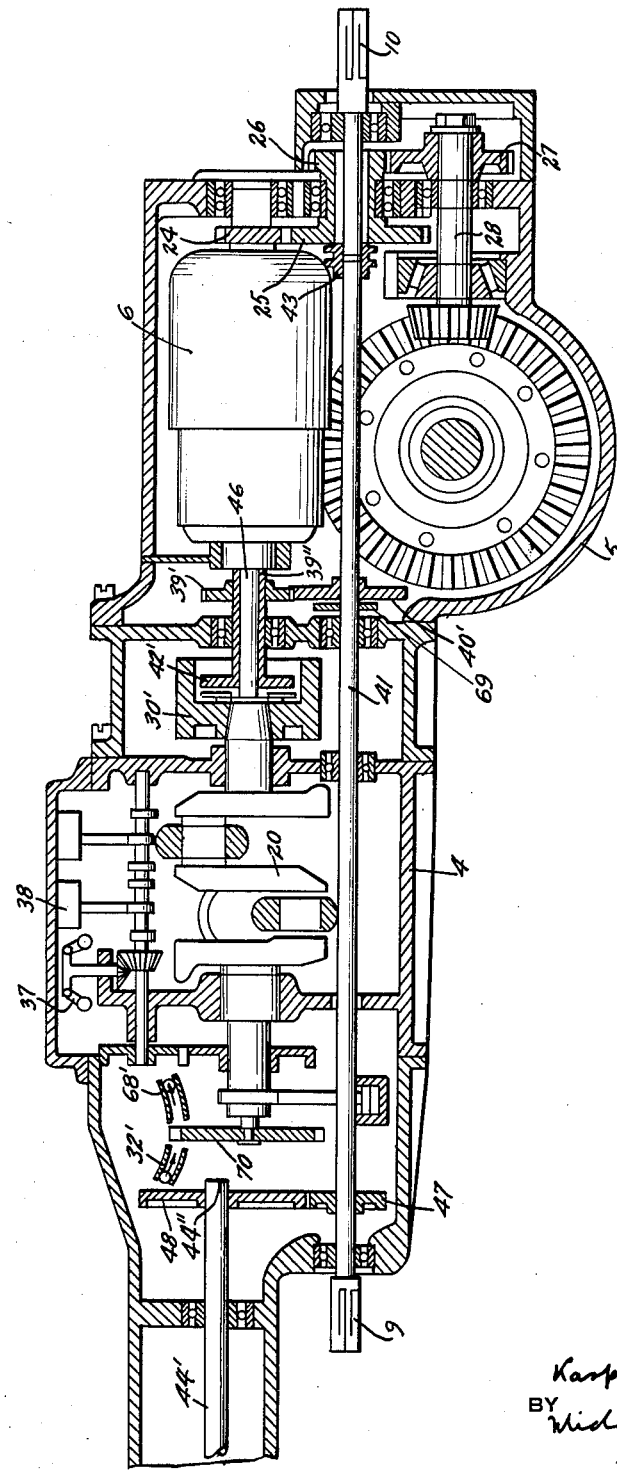
FIG. 3 is a longitudinal axial sectional elevational view showing another embodiment of an engine and transmission arrangement of a vehicle according to the present invention.

In the embodiment of the invention which is shown in FIG. 3, those elements which correspond to the above described elements but are of a slightly different construction or are situated differently are indicated by the same reference characters primed. In this embodiment the power-takeoff shaft 44' is not connected directly with the crank shaft 20. Instead the right end 44" of the shaft 44', as viewed in FIG. 3, fixedly carries a gear 48 which meshes with a gear 47 carried by the power-takeoff shaft 9, so that the shaft 44' is driven with the power-takeoff shaft 9 and may therefore be operated either according to the speed of the engine or according to the speed of movement of the vehicle. In the embodiment of FIG. 3 the left end of the crank shaft fixedly carries a separate blower impeller 70 which sucks air through the inlets 32' and discharges the air through the discharged ports 68' to send a stream of air rearwardly to the exterior of the cylinders of the engine. In the embodiment of FIG. 3 the fly wheel 30' is located at the right end portion of the crank shaft of the engine, and the friction clutch 42' is accommodated in a recess of the fly wheel 30', as was the case with the friction clutch 42 and the fly wheel 30 of FIG. 2. The crank shaft 20 which is directly connected with the input end of the torque converter 6 of FIG. 3 carries between this torque converter 6 and the fly wheel 30' the gear 39' which is fixed to the right end of a tubular member 39" through which the crank shaft 20 passes and with which the crank shaft is placed in driving engagement through operation of the friction clutch 42', FIG. 3 showing the extension 46 of the crank shaft which extends through this tubular member and is connected directly with the input end of the torque converter 6. The gear 39' meshes with the gear 40' which is connected with the shaft 41 through a clutch member 69, and the shaft 41 is connected with the power-takeoff shaft 10 through the clutch member 43 in the same way as was described above. Thus, with the embodiment of FIG. 3 all of the structure is the same as that of FIG. 2 except that the power-takeoff shaft 44' is capable of being operated either according to the speed of the engine or according to the speed of the movement of the vehicle.

The power-takeoff shaft 44' may be operatively connected with any accessories such as mowers, spreaders, and the like, and the same is true of the other power-takeoff shafts.

Figure 4:
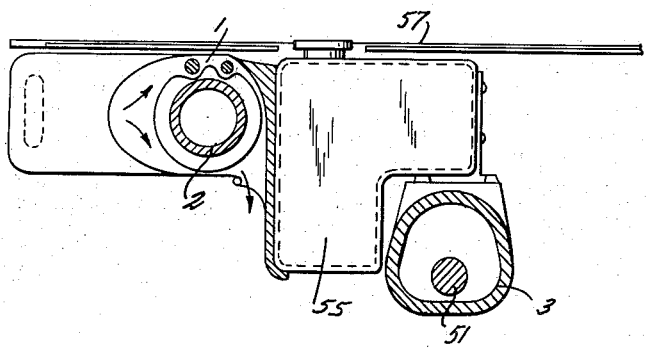
FIG. 4 is a sectional elevational view taken along line IV—IV of FIG. 1 in the direction of the arrows.

As may be seen from FIG. 1, a fuel tank 55 is located just to the rear of the cylinder 2 and a storage battery 56 is located just to the rear of the cylinder 2'. These components are supported on the tubular portions 3 and 3' of the rear housing member 5, and these elements 55 and 56 as well as the cylinders are located beneath a horizontal floor 57 of the vehicle which is indicated in FIG. 4. This flat floor of the vehicle may conveniently be hinged to the frame of the vehicle at several portions of this floor so that it may be turned upwardly to an inoperative position in order to give free access to components beneath the floor. As is apparent from FIG. 4, the fuel tank 55 conforms to the shape of the space between the cylinder 2 and the tubular portion 3 of the rear housing, and because the cylinder 2 is located from the housing portion 3 at a distance greater than the cylinder 2' from the housing portion 3', it is possible to accommodate between the parts 2 and 3 a fuel tank which has the largest possible size and which even has a downwardly extending portion located between the parts 2 and 3, as shown in FIG. 4, so that a relatively large amount of fuel may be located in the tank.

It will be noted that all of the components such as the drives, the housings, the storage battery and fuel tanks are located beneath the floor 57, while all of the elements which are to be operated by the operator are located above the floor of the vehicle. This floor, instead of being turnable to and from a position covering the engine and drive may simply be removable. As is particularly apparent from FIG. 1, the rear housing 5 extends upwardly between the fuel tank 55 and the storage battery 56.

Thus, it is apparent that with the above described structure not only is a very compact, lightweight assembly provided, but in addition the structure is quite simple while at the same being extremely flexible and being able to accommodate all types of accessories which may even be simultaneously driven from the tractor of the invention. It will be noted from FIG. 2 that the shaft 64 has a curved portion 64' which enables shaft 64 to clear the shaft 44 during steering of the vehicle.

It will be understood that each of the elements described above, or two or more together, may also find a useful application in other types of vehicles differing from the types described above.

While the invention has been illustrated and described as embodied in tractors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a vehicle such as a tractor or the like, in combination, rear housing means; elongated tubular front housing means fixed to and extending forwardly from said rear housing means; front wheel means operatively connected with and located adjacent the front end of said front housing means; rear wheel means operatively connected with and located adjacent the rear end of said rear housing means, said rear wheel means including a pair of rear wheels respectively spaced from and located on opposite sides of said rear housing means, said rear housing means and front housing means cooperating together to form a central longitudinal frame for the vehicle and extending along a central longitudinal axis of the vehicle; an engine housed in part within said rear housing means and having a pair of opposed horizontal cylinders respectively extending from opposite sides of said rear housing means; a fuel tank located just to the rear of one of said cylinders between said rear housing means and one of said rear wheels; and a storage battery located just to the rear of the other of said cylinders between said rear housing means and the other of said rear wheels.

2. In a vehicle such as a tractor or the like, in combination, rear housing means; elongated tubular front housing means fixed to and extending forwardly from said rear housing means; front wheel means operatively connected with and located adjacent the front end of said front housing means; rear wheel means operatively connected with and located adjacent the rear end of said rear housing means, said rear wheel means including a pair of rear wheels respectively spaced from and located on opposite sides of said rear housing means, said rear housing means and front housing means cooperating together to form a central longitudinal frame for the vehicle and extending along a central longitudinal axis of the vehicle; an engine housed in part within said rear housing means and having a pair of opposed horizontal cylinders respectively extending from opposite sides of said rear housing means; a fuel tank located just to the rear of one of said cylinders between said rear housing means and one of said rear wheels; and a storage battery located just to the rear of the other of said cylinders between said rear housing means and the other of said rear wheels, said rear wheel means including an axle and one of said cylinders being located more distant from said axle than the other of said cylinders, and the fuel tank being located behind said one cylinder and having a shape corresponding to the space between said one cylinder and a portion of said rear housing means which houses part of said rear axle.

3. In a vehicle such as a tractor or the like, in combination, rear housing means; elongated tubular front housing means fixed to and extending forwardly from said rear housing means; front wheel means operatively connected with and located adjacent the front end of said front housing means; rear wheel means operatively connected with and located adjacent the rear end of said rear housing means, said rear wheel means including a pair of rear wheels respectively spaced from and located on opposite sides of said rear housing means, said rear housing means and front housing means cooperating together to form a central longitudinal frame for the vehicle and extending along a central longitudinal axis of the vehicle; an engine housed in part within said rear housing means and having a pair of opposed horizontal cylinders respectively extending from opposite sides of said rear housing means; a fuel tank located just to the rear of one of said cylinders between said rear housing means and one of said rear wheels; a storage battery located just to the rear of the other of said cylinders between said rear housing means and the other of said rear wheels; and substantially flat floor means located over said fuel tank and storage battery.

4. In a vehicle such as a tractor or the like, in combination, rear housing means; elongated tubular front housing means fixed to and extending forwardly from said rear housing means; front wheel means operatively connected with and located adjacent the front end of said front housing, means; rear wheel means operatively connected with and located adjacent the rear end of said rear housing means, said rear wheel means including a pair of rear wheels respectively spaced from and located on opposite sides of said rear housing means, said rear housing means and front housing means cooperating together to form a central longitudinal frame for the vehicle and extending along a central longitudinal axis of the vehicle; an engine housed in part within said rear housing means and having a pair of opposed horizontal cylinders respectively extending from opposite sides of said rear housing means; a fuel tank located just to the rear of one of said cylinders between said rear housing means and one of said rear wheels; a storage battery located just to the rear of the other of said cylinders between said rear housing means and the other of said rear wheels; and substantially flat floor means located over said fuel tank and storage battery, said floor means being movable away from a horizontal position covering said storage battery and fuel tank.

References Cited in the file of this patent

UNITED STATES PATENTS

| | | |
|---|---|---|
| 1,948,744 | Curtiss | Feb. 27, 1934 |
| 2,378,615 | Brown | June 19, 1945 |
| 2,511,692 | Brown | June 13, 1950 |
| 2,572,911 | Brown | Oct. 30, 1951 |
| 2,580,481 | Strehlow | Jan. 1, 1952 |
| 2,624,415 | Moore | Jan. 6, 1953 |
| 2,853,142 | Roszler et al. | Sept. 23, 1958 |
| 2,945,382 | Ritter et al. | July 19, 1960 |

FOREIGN PATENTS

| | | |
|---|---|---|
| 890,642 | France | Nov. 8, 1943 |
| 902,097 | Germany | Jan. 18, 1954 |
| 941,771 | Germany | Apr. 19, 1956 |
| 943,797 | Germany | June 1, 1956 |
| 1,031,144 | Germany | May 29, 1958 |